US009213629B2

(12) United States Patent  
Yeh

(10) Patent No.: US 9,213,629 B2  
(45) Date of Patent: Dec. 15, 2015

(54) BLOCK MANAGEMENT METHOD, MEMORY CONTROLLER AND MEMORY STOARGE APPARATUS

(75) Inventor: Chih-Kang Yeh, Kinmen County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 319 days.

(21) Appl. No.: 13/233,034

(22) Filed: Sep. 15, 2011

(65) Prior Publication Data  
US 2013/0019049 A1 Jan. 17, 2013

(30) Foreign Application Priority Data  
Jul. 13, 2011 (TW) .............................. 100124759 A

(51) Int. Cl.  
G06F 12/02 (2006.01)

(52) U.S. Cl.  
CPC .................. G06F 12/0246 (2013.01)

(58) Field of Classification Search  
USPC ......................................... 711/103  
See application file for complete search history.

(56) References Cited

U.S. PATENT DOCUMENTS

| | | | |
|---|---|---|---|
| 6,985,992 B1* | 1/2006 | Chang et al. ................. | 711/103 |
| 8,291,155 B2* | 10/2012 | Lai et al. ..................... | 711/103 |
| 8,296,504 B2* | 10/2012 | Chu et al. ..................... | 711/103 |
| 2005/0204187 A1* | 9/2005 | Lee et al. ...................... | 714/8 |
| 2008/0082736 A1* | 4/2008 | Chow et al. .................. | 711/103 |
| 2010/0070735 A1* | 3/2010 | Chen et al. ................... | 711/206 |
| 2010/0115175 A9* | 5/2010 | Zhuang et al. ............... | 711/103 |
| 2010/0169544 A1* | 7/2010 | Eom et al. ..................... | 711/103 |
| 2010/0325524 A1* | 12/2010 | Yang et al. .................... | 714/773 |
| 2011/0004723 A1* | 1/2011 | Kheng-Chong .............. | 711/103 |
| 2011/0078363 A1* | 3/2011 | Yeh et al. ..................... | 711/103 |
| 2011/0125954 A1* | 5/2011 | Yeh et al. ..................... | 711/103 |
| 2011/0145480 A1* | 6/2011 | Ng et al. ...................... | 711/103 |
| 2012/0185740 A1* | 7/2012 | Hsu et al. ..................... | 714/719 |

FOREIGN PATENT DOCUMENTS

CN 102109965 6/2011

OTHER PUBLICATIONS

"Office Action of China Counterpart Application", issued on Oct. 30, 2014, p. 1-9.

* cited by examiner

Primary Examiner — Jared Rutz  
Assistant Examiner — Christopher Do  
(74) Attorney, Agent, or Firm — Jianq Chyun IP Office

(57) ABSTRACT

A block management method for a rewritable non-volatile memory module having a plurality of physical blocks, and a memory controller and memory storage apparatus using the same are provided. The method includes logically grouping the physical blocks at least into a data area, a free area and a replacement area and configuring a plurality of logical blocks for mapping to the physical blocks of the data area. The method also includes assigning bad physical blocks into the data area and marking the logical blocks mapping to the bad physical blocks as bad logical addresses, thereby forbidding the access of the logical blocks mapping to the bad physical blocks. According, the method can effectively use the rewritable non-volatile memory module having too many bad physical blocks to store data.

24 Claims, 12 Drawing Sheets

| Logical block address | Physical block address | Mark |
|---|---|---|
| 610(0) | 410(0) | 0 |
| 610(1) | 410(1) | 0 |
| 610(2) | 410(2) | 0 |
| ⋮ | ⋮ | ⋮ |
| 610(K) | 410(P) | 1 |
| ⋮ | ⋮ | ⋮ |
| 610(H-1) | 410(F-2) | 0 |
| 610(H) | 410(F-1) | 0 |

| Logical block address | Physical block address | Mark |
|---|---|---|
| 610(0) | 410(0) | 0 |
| 610(1) | 410(1) | 0 |
| ⋮ | ⋮ | ⋮ |
| 610(H) | 410(F-1) | 0 |

| Logical block address | Physical block address | Mark |
|---|---|---|
| 610(0) | 410(0) | 0 |
| 610(1) | 410(F) | 1 |
| 610(2) | 410(2) | 0 |
| ⋮ | ⋮ | ⋮ |
| 610(H) | 410(F-1) | 0 |

800

BLOCK MANAGEMENT METHOD, MEMORY CONTROLLER AND MEMORY STOARGE APPARATUS

CROSS-REFERENCE TO RELATED APPLICATION

This application claims the priority benefit of Taiwan application serial no. 100124759, filed on Jul. 13, 2011. The entirety of the above-mentioned patent application is hereby incorporated by reference herein and made a part of this specification.

BACKGROUND

1. Technology Field

The present invention relates to a block management method and particularly to a block management method for managing physical blocks of a rewritable non-volatile memory module, and a memory controller and a memory storage apparatus using the same.

2. Description of Related Art

Along with the widespread of digital cameras, cell phones, and MP3 in recently years, the consumers' demand to storage media has increased drastically. Rewritable non-volatile memory is one of the most adaptable memories for electric products (e.g. notebooks) due to its characteristics such as data non-volatility, low power consumption, small volume, non-mechanical structure and high access speed. A solid state drive (SSD) is a storage apparatus adopting NAND flash memory as storage medium. Therefore, the flash memory industry has become a very important part of the electronic industry in recent years.

A rewritable non-volatile memory module has a plurality of physical blocks, and each physical block has a plurality of physical pages, wherein data must be written orderly into a physical block according to the sequence of the physical pages in the physical block. Additionally, a physical page, which has stored data thereon, has to be erased before the physical page is used for writing with data again. In particular, a smallest unit for erasing data is one physical block, and a smallest unit for programming (also referred to writing) data is one physical page.

Therefore, when a rewritable non-volatile memory storage apparatus (hereinafter referred to as the memory storage apparatus) is manufactured and pre-formatted (i.e., a pre-formatting operation), the memory controller of the memory storage apparatus performs a scan disk operation on all physical blocks of the rewritable non-volatile memory module to identify good physical blocks, selecting enough physical blocks for a data area and a spare area from the good physical blocks and groups other good physical blocks into a replacement area. Herein, the pre-formatting operation includes initial steps needed to be perform on the rewritable non-volatile memory storage apparatus before the rewritable non-volatile memory storage apparatus is formatted.

The physical blocks of the data area are used for storing data written by the host system and the physical blocks of the spare area is used for substituting the physical blocks of the data area. Accordingly, the physical blocks of the spare area are either blank or available blocks (i.e., no data is recorded in these blocks or data recorded in these blocks is marked as invalid data). That is, the physical pages of the physical blocks of the data area and the spare area are used alternately for mapping to the logical pages of the logical blocks to store data written by the host system. For example, when the host system is about to store data on a logical page of a logical block in the memory storage apparatus, the memory controller selects a physical block as a substitution block, writes the data into a physical page of the substitution physical block and records a mapping for indicating that the data of this logical page is stored on this physical page. Additionally, a physical page originally mapping to the logical page in the data area is marked as invalid.

The physical blocks of the replacement area are used for replacing bad physical blocks occurred during the operation of memory storage apparatus. In details, after an erasing count of a physical block exceeds a threshold (e.g., 10000), the physical block may become a bad physical block that can not be programmed anymore. Therefore, when a physical block in the data area becomes a bad physical block, the memory controller tries to get an available physical block from the replacement area for replacing the bad physical block. In particular, if there is no more available physical block in the replacement area, the memory storage apparatus is announced as being in a write-protect status and cannot be used for writing data anymore.

However, in fact, when there is no more available physical block in the replacement area for replacing the bad physical blocks, there are still many good physical blocks in the data area and the spare area. Therefore, if these good physical blocks can continue to be used for storing data, the lifespan of the memory storage apparatus may be prolonged.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

Accordingly, the present invention is directed to a block management method, a memory controller, and a memory storage apparatus, which are capable of effectively using undamaged physical blocks in the rewritable non-volatile memory module.

According to an exemplary embodiment of the present invention, a block management method for a rewritable non-volatile memory module is provided, wherein the rewritable non-volatile memory module has a plurality of physical blocks. The block management method includes logically grouping the physical blocks into at least a data area, a spare area and a replacement area, wherein the physical blocks of the data area includes at least one bad physical block. The block management method also configuring a plurality of logical blocks for mapping to the physical blocks of the data area, wherein each of the logical blocks independently maps to one of the physical blocks of the data area. The block management method further includes marking logical block mapping to the at least one bad physical block as a bad logical address.

According to an exemplary embodiment of the present invention, a block management method for a rewritable non-volatile memory module is provided, wherein the rewritable non-volatile memory module has a plurality of physical blocks. The block management method includes logically grouping the physical blocks into at least a data area, a spare area and a replacement area and configuring a plurality of logical blocks for mapping to the physical blocks of the data area, wherein each of the logical blocks independently maps to one of the physical blocks of the data area. The block management method also includes receiving a first write command and first write data corresponding to the first write command from a host system, wherein the first write data belongs to a first logical block and the first logical block maps to a first physical block among the physical blocks of the data area. The block management method still includes selecting a second physical block from the spare area, giving a first program command for writing the first write data into the second physical block and determining whether the first write data is written successfully into the second physical block. The block management method further includes if the first write data is not written successfully into the second physical block, determining whether there is an available physical block in the replacement area; and if there is no available physical block in the replacement area, remapping the first logical block to the second physical block, marking the first logical block as a bad logical address and associating the first physical block with the spare area.

According to an exemplary embodiment of the invention, a memory controller for controlling a rewritable non-volatile memory module is provided, wherein the rewritable non-volatile memory module has a plurality of physical blocks. The memory controller includes a host interface, a memory interface and a memory management circuit. The host interface is configured to couple to a host system. The memory interface is configured for coupling to the rewritable non-volatile memory module. The memory management circuit is coupled to the host interface and the memory interface and configured for logically grouping the physical blocks into at least a data area, a spare area and a replacement area, wherein the physical blocks of the data area includes at least one bad physical block. Additionally, the memory management circuit is further configured for configuring a plurality of logical blocks for mapping to the physical blocks of the data area, wherein each of the logical blocks independently maps to one of the physical blocks of the data area. Furthermore, the memory management circuit is further configured for marking logical block mapping to the at least one bad physical block as a bad logical address.

According to an exemplary embodiment of the invention, a memory controller for controlling a rewritable non-volatile memory module is provided, wherein the rewritable non-volatile memory module has a plurality of physical blocks. The memory controller includes a host interface, a memory interface and a memory management circuit. The host interface is configured to couple to a host system. The memory interface is configured for coupling to the rewritable non-volatile memory module. The memory management circuit is coupled to the host interface and the memory interface and configured for logically grouping the physical blocks into at least a data area, a spare area and a replacement area. Additionally, the memory management circuit is further configured for configuring a plurality of logical blocks for mapping to the physical blocks of the data area, wherein each of the logical blocks independently maps to one of the physical blocks of the data area. Furthermore, the memory management circuit receives a first write command and first write data corresponding to the first write command from the host system through the host interface, wherein the first write data belongs to a first logical block and the first logical block maps to a first physical block among the physical blocks of the data area. And, the memory management circuit is further configured for selecting a second physical block from the spare area, giving a first program command for writing the first write data into the second physical block and determining whether the first write data is written successfully into the second physical block. When the first write data is not written successfully into the second physical block, the memory management circuit determines whether there is an available physical block in the replacement area. When there is no available physical block in the replacement area, the memory management circuit remaps the first logical block to the second physical block, marks the first logical block as a bad logical address and associates the first physical block with the spare area.

According to an exemplary embodiment of the present invention, a memory storage apparatus including a connector for coupling to a host system, a rewritable non-volatile memory module having a plurality of physical blocks and a memory controller is provided. The memory controller is coupled to the rewritable non-volatile memory module and the connector and configured for logically grouping the physical blocks into at least a data area, a spare area and a replacement area, wherein the physical blocks of the data area includes at least one bad physical block. And, the memory controller is further configured for configuring a plurality of logical blocks for mapping to the physical blocks of the data area, wherein each of the logical blocks independently maps to one of the physical blocks of the data area. Furthermore, the memory controller is further configured for respectively marking logical block mapped to the at least one bad physical block as a bad logical address.

According to an exemplary embodiment of the present invention, a memory storage apparatus including a connector for coupling to a host system, a rewritable non-volatile memory module having a plurality of physical blocks and a memory controller is provided. The memory controller is coupled to the rewritable non-volatile memory module and the connector and configured for logically grouping the physical blocks into at least a data area, a spare area and a replacement area. Additionally, the memory controller is further configured for configuring a plurality of logical blocks for mapping to the physical blocks of the data area, wherein each of the logical blocks independently maps to one of the physical blocks of the data area. Furthermore, the memory controller receives a first write command and first write data corresponding to the first write command from the host system through the connector, wherein the first write data belongs to a first logical block and the first logical block maps to a first physical block among the physical blocks of the data area. And, the memory controller is further configured for selecting a second physical block from the spare area, giving a first program command for writing the first write data into the second physical block and determining whether the first write data is written successfully into the second physical block. When the first write data is not written successfully into the second physical block, the memory controller determines whether there is an available physical block in the replacement area. When there is no available physical block in the replacement area, the memory controller remaps the first logical block to the second physical block, marks the first logical block as a bad logical address and associates the first physical block with the spare area.

Based on the above, in the exemplary embodiment of the present invention, the block management method, the memory controller and the memory storage apparatus are capable of effectively utilizing undamaged physical blocks, such that the rewritable non-volatile memory module having too many bad physical blocks still can be used for storing data and the lifespan of the memory storage apparatus can be prolonged.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

In order to make the aforementioned and other features and advantages of the present invention more comprehensible, embodiments accompanying figures are described in detail below.

BRIEF DESCRIPTION OF THE DRAWINGS

The accompanying drawings constituting a part of this specification are incorporated herein to provide a further understanding of the invention. Here, the drawings illustrate embodiments of the invention and, together with the description, serve to explain the principles of the invention.

FIG. 8 is an example diagram illustrating a block mapping table according to the first exemplary embodiment of the present invention.

FIG. 11 is an example diagram illustrating a block mapping table established during a pre-formatting operation according to the second exemplary embodiment of the present invention.

DESCRIPTION OF EMBODIMENTS

Figure 1A:
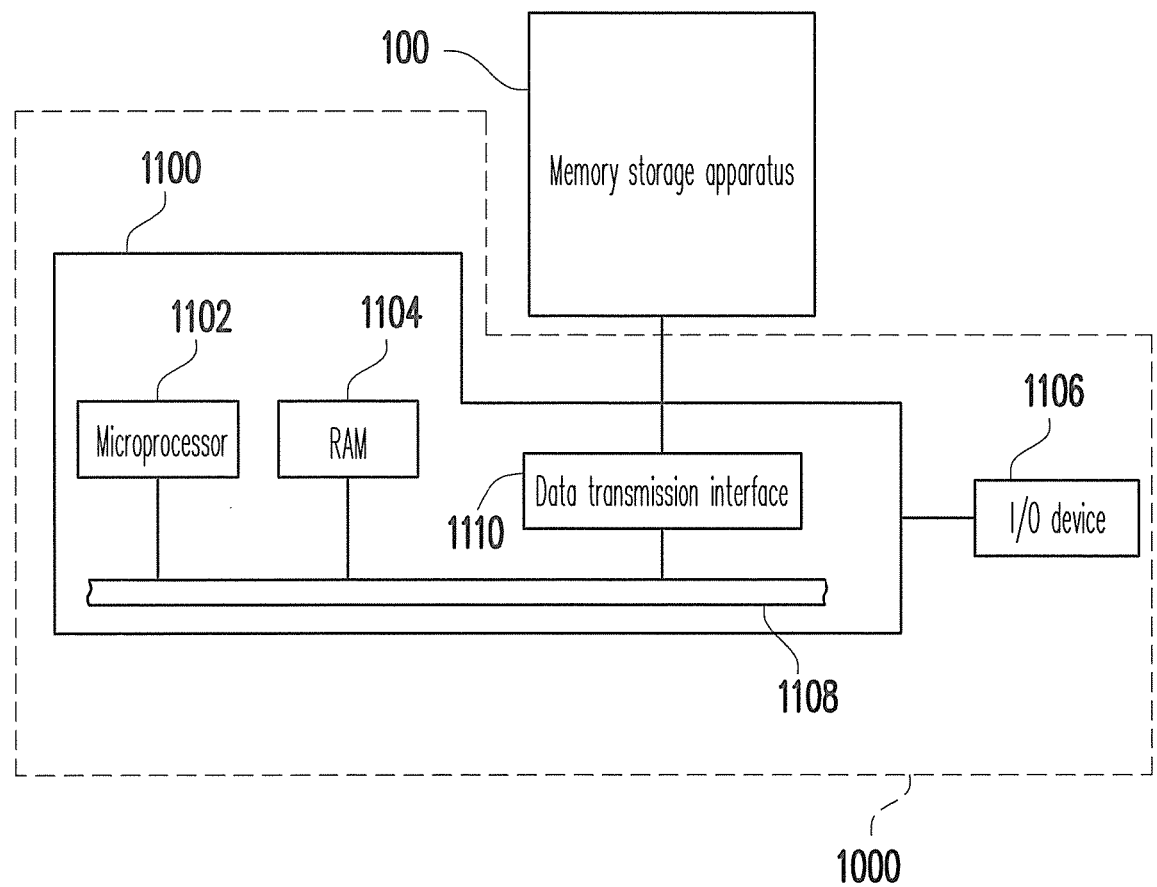
FIG. 1A is a block diagram of a host system and a memory storage apparatus according to a first exemplary embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

First Exemplary Embodiment

A memory storage apparatus (i.e., a memory storage system), typically, includes a rewritable non-volatile memory module and a controller (i.e., a control circuit). The memory storage apparatus is usually used together with a host system so that the host system can write data into or read data from the memory storage apparatus.

FIG. 1A is a block diagram of a host system and a memory storage apparatus according to the first exemplary embodiment of the present invention.

Figure 1B:
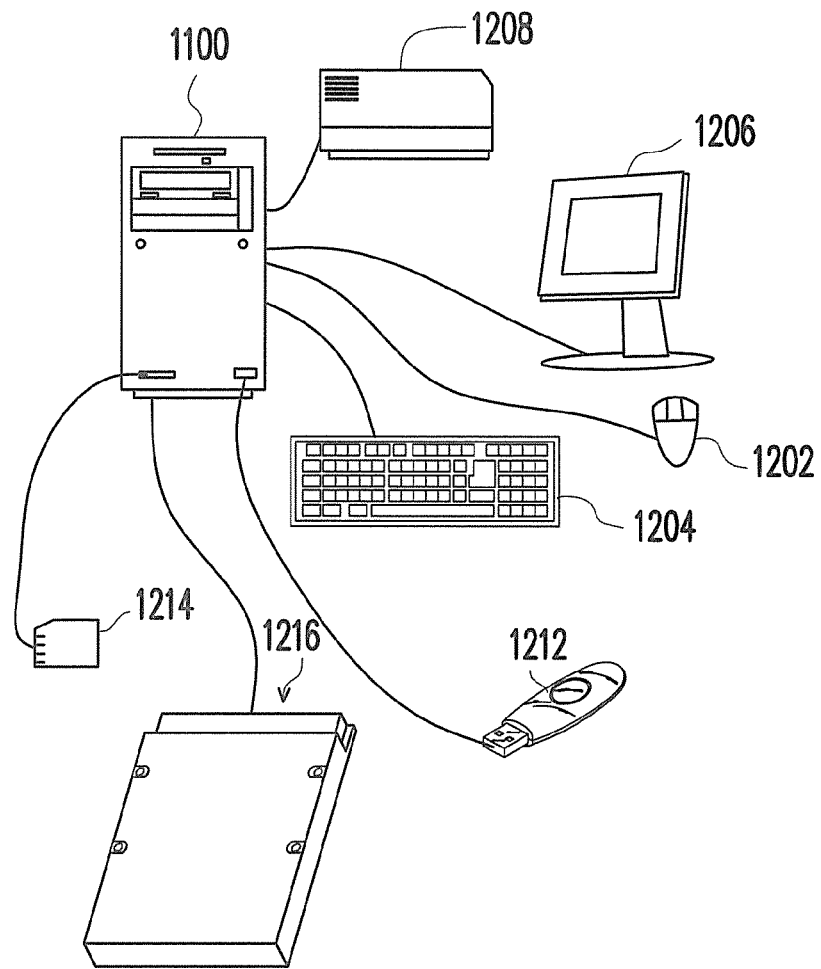
FIG. 1B is a diagram illustrating a computer, an input/output (I/O) device, and a memory storage apparatus according to the first exemplary embodiment of the present invention.

Referring to FIG. 1A, a host system 1000 includes a computer 1100 and an input/output (I/O) device 1106. The computer 1100 includes a microprocessor 1102, a random access memory (RAM) 1104, a system bus 1108 and a data transmission interface 1110. The I/O device 1106 includes a mouse 1202, a keyboard 1204, a display 1206, and a printer 1208 as shown in FIG. 1B. It should be noted that the devices in FIG. 1B do not limit the I/O device 1106; the I/O device 1106 may include other devices.

In the present exemplary embodiment, the memory storage apparatus 100 is coupled to the devices of the host system 1000 through the data transmission interface 1110. By using the microprocessor 1102, the random access memory (RAM) 1104 and the Input/Output (I/O) device 1106, the data may be write into the memory storage apparatus 100 or may be read from the memory storage apparatus 100. For example, the memory storage apparatus 100 may be a rewritable non-volatile memory storage apparatus, such as a flash drive 1212, a memory card 1214, or a solid state drive (SSD) 1216 shown in FIG. 1B.

Figure 1C:
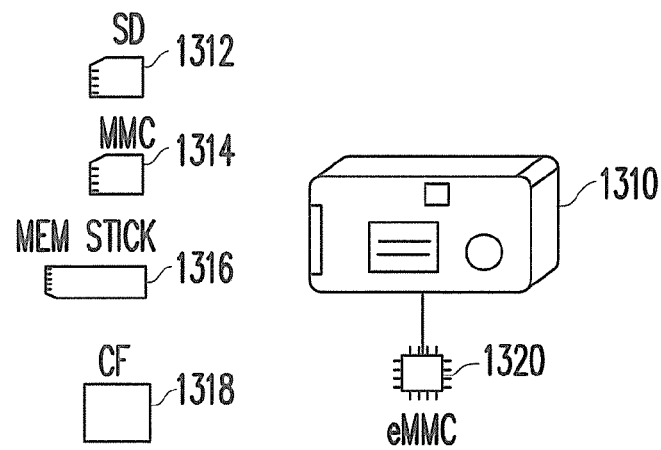
FIG. 1C is a diagram of a host system and a memory storage apparatus according to another exemplary embodiment of the present invention.

Generally, the host system 1000 substantially could be any system capable of operating with the memory storage apparatus 100 to store data. Even though the host system 1000 is described as a computer system in the present exemplary embodiment, in another exemplary embodiment of the present invention, the host system 1000 may also be a digital camera, a video camera, a communication device, an audio player, or a video player, and etc. For example, if the host system is a digital camera (video camera) 1310, the memory storage apparatus is then a SD card 1312, a MMC card 1314, a memory stick 1316, a CF card 1318 or an embedded storage device 1320 (as shown in FIG. 1C). The embedded storage device 1320 includes an embedded MMC (eMMC). It should be noted that the eMMC is directly coupled to the substrate of the host system.

Figure 2:
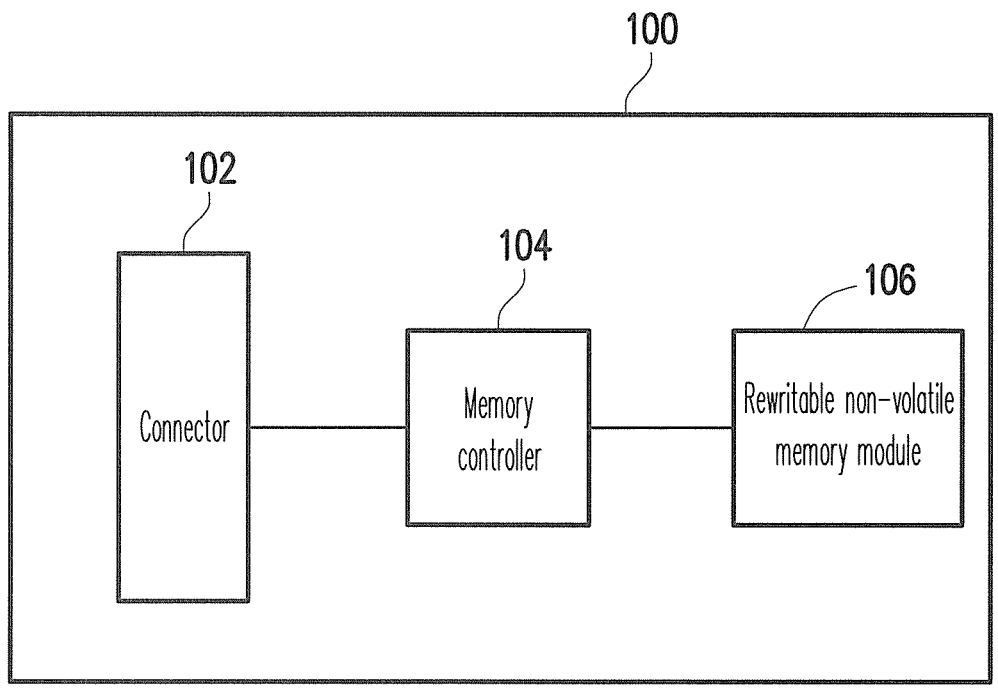
FIG. 2 is a schematic block diagram of the memory storage apparatus in FIG. 1A.

FIG. 2 is a schematic block diagram of the memory storage apparatus in FIG. 1A.

Referring to FIG. 2, the memory storage apparatus 100 includes a connector 102, a memory controller 104, and a rewritable non-volatile memory module 106.

In the present exemplary embodiment, the connector 102 complies with a serial advanced technology attachment (SATA) standard. However, it should be noticed that the present invention is not limited to the aforementioned description and the connector 102 also may comply with an institute-of-electrical-and-electronic-engineers (IEEE) 1394 standard, a Parallel Advanced Technology Attachment (PATA) standard, a peripheral-component Interconnect-express (PCI Express) standard, a universal serial bus (USB) standard, a secure digital (SD) interface standard, a memory stick (MS) interface standard, a multi-media-card (MMC) interface standard, a compact flash (CF) interface standard, an integrated-device-electronics (IDE) standard or other suitable standards.

The memory controller 104 executes a plurality of logic gates or control instructions implemented in a hardware form or a firmware form and performs various data operations such as data writing, reading, erasing and merging in the rewritable non-volatile memory module 106 according to commands from the host system 1000.

The rewritable non-volatile memory module 106 is coupled to the memory controller 104 and has a plurality of physical blocks for storing data written by the host system 1000. In the present exemplary embodiment, each of the physical blocks has a plurality of physical pages, wherein the physical pages belonging to the same physical block may be written individually and must be erased simultaneously. For example, each physical block is composed of 128 physical pages and the size of each of the physical pages is 4 kilobytes (KB). However, it should be noticed that the present invention is not limited thereto and each physical block may be composed of 64 physical pages, 256 physical pages or more physical pages.

In details, each physical block is the smallest erasing unit. Namely, each physical block contains the least number of memory cells that are erased together. And, one physical page is the smallest programming unit. Namely, each physical page is the smallest unit for writing data. However, it should be understood that in another exemplary embodiment, the smallest unit for writing data may be one physical sector or other size. Each physical page usually includes a user data bit area and a redundant bit area. The user data bit area is used for storing user data, and the redundant bit area is used for storing system data (for example, the ECC code).

In the present exemplary embodiment, the rewritable non-volatile memory module 106 is a multi level cell (MLC) NAND flash memory module. However, the present invention is not limited thereto, and the rewritable non-volatile memory module 106 may also be a single level cell (SLC) NAND flash memory module, other flash memory module or other memory module having the same characteristic.

Figure 3:
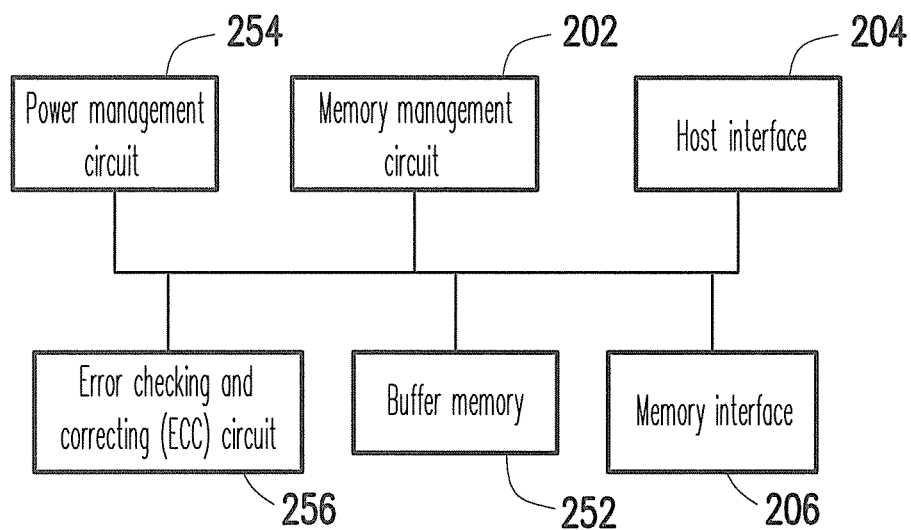
FIG. 3 is a schematic block diagram of a memory controller according to the first exemplary embodiment of the present invention.

FIG. 3 is a schematic block diagram of a memory controller according to the first exemplary embodiment of the present invention.

Referring to FIG. 3, the memory controller 104 includes a memory management circuit 202, a host interface 204 and a memory interface 206.

The memory management circuit 202 controls the overall operation of the memory controller 104. To be specific, the memory management circuit 202 has a plurality of control instructions, and the control instructions are executed to manage the physical blocks of the rewritable non-volatile memory module 106 according to the block management method of the present exemplary embodiment.

In the present exemplary embodiment, the control instructions of the memory management circuit 202 are implemented in a firmware form. For example, the memory management circuit 202 has a microprocessor unit (not shown) and a read-only memory (ROM, not shown), and the control instructions are burnt into the ROM. When the memory storage apparatus 100 is enabled, the control instructions are executed by the micro-processor unit to perform various data operations such as data writing, reading, erasing and merging.

In another exemplary embodiment of the present invention, the control instructions of the memory management circuit 202 are stored in a specific area (for example, the system area of the memory module exclusively used for storing system data) of the rewritable non-volatile memory module 106 as program codes. Besides, the memory management circuit 202 has a microprocessor unit (not shown), a ROM (not shown), and a RAM (not shown). In particular, the ROM has a boot code, and when the memory controller 104 is enabled, the microprocessor unit first executes the boot code to load the control instructions from the rewritable non-volatile memory module 106 into the RAM of the memory management circuit 202. Then, the micro-processor unit runs these control instructions to perform the data writing operation, the data reading operation, the data erasing operation and so on. Additionally, in another exemplary embodiment of the invention, the control instructions of the memory management circuit 202 may also be implemented in a hardware form.

The host interface 204 is coupled to the memory management circuit 202 and configured for receiving and identifying commands and data received from the host system 1000. Namely, commands and data transmitted by the host system 1000 are sent to the memory management circuit 202 through the host interface 204. In the present exemplary embodiment, the host interface 204 complies with the SATA standard. However, it should be understood that the invention is not limited thereto, and the host interface 204 may complies with the PATA standard, the IEEE 1394 standard, the PCI express standard, the USB standard, the SD standard, the MS standard, the MMC standard, the CF standard, the IDE standard, or other suitable data transmission standards.

The memory interface 206 is coupled to the memory management circuit 202 and configured to access the rewritable non-volatile memory module 106. Namely, data to be written into the rewritable non-volatile memory module 106 is converted by the memory interface 206 into a format acceptable to the rewritable non-volatile memory module 106.

In an exemplary embodiment of the present invention, the memory controller 104 further includes a buffer memory 252. The buffer memory 252 is coupled to the memory management circuit 202 and configured to temporarily store data and commands received from the host system 1000 or data received from the rewritable non-volatile memory module 106.

In an exemplary embodiment of the present invention, the memory controller 104 further includes a power management circuit 254. The power management circuit 254 is coupled to the memory management circuit 202 and configured to control the power supply of the memory storage apparatus 100.

In another exemplary embodiment of the present invention, the memory controller 104 still includes an error checking and correcting circuit 256. The error checking and correcting circuit 256 is coupled to the memory management circuit 202, and configured for executing an error checking and correcting procedure to ensure data accuracy. To be specific, when the memory management circuit 202 receives a write command from the host system 1000, the error checking and correcting circuit 256 generates an error checking and correcting (ECC)

code for data corresponding to the write command, and the memory management circuit 202 writes the data and the corresponding ECC code into the rewritable non-volatile memory module 106. Subsequently, when the memory management circuit 202 reads the data from the rewritable non-volatile memory module 106, the memory management circuit 202 simultaneously reads the corresponding ECC code, and the error checking and correcting circuit 256 executes the ECC procedure for the read data based on the corresponding ECC code.

Figure 4A:
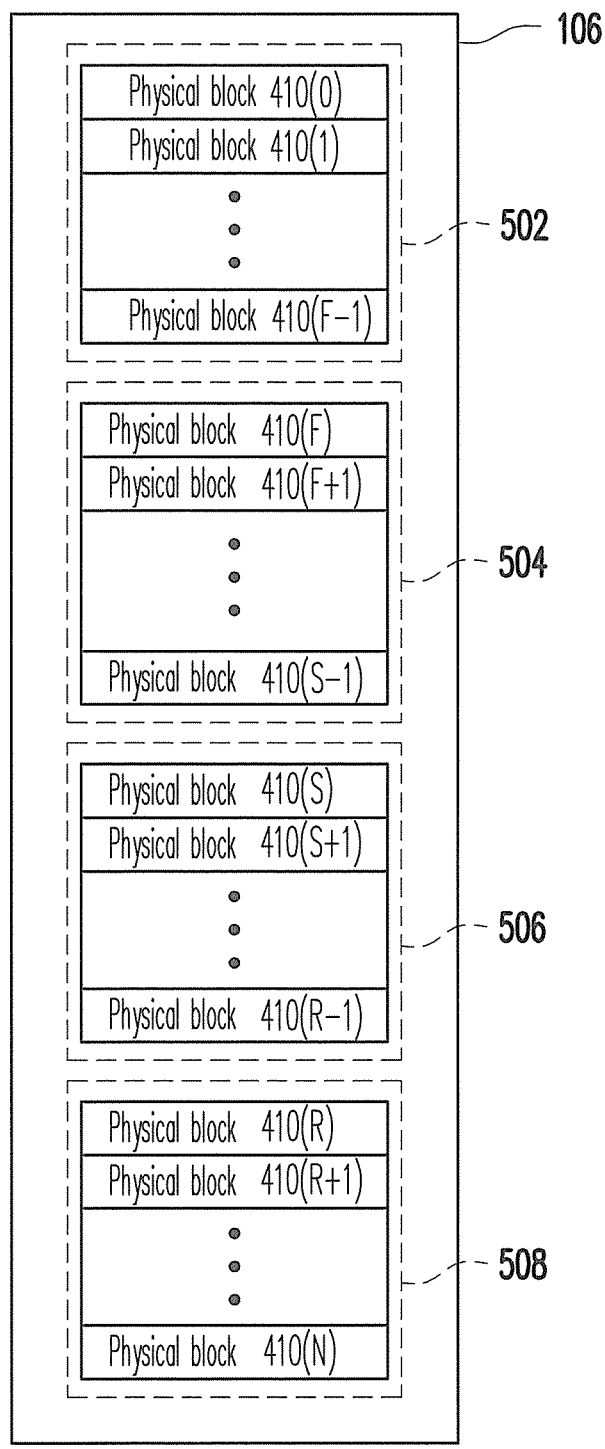
FIGS. 4A and 4B are schematic diagrams of managing physical blocks in a rewritable non-volatile memory module according to the first exemplary embodiment of the present invention.
Figure 4B:
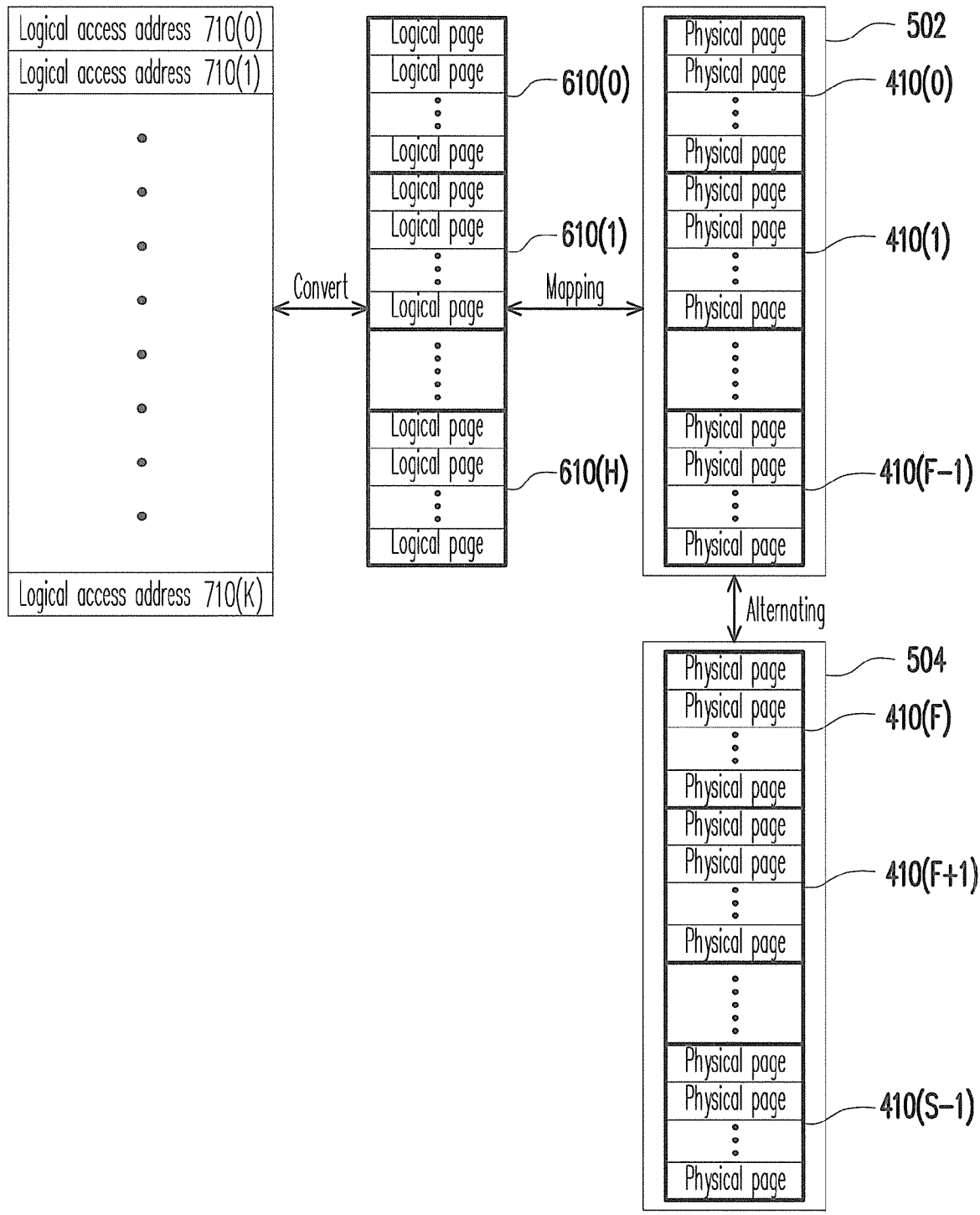

FIGS. 4A and 4B are schematic diagrams of managing physical blocks in a rewritable non-volatile memory module according to the first exemplary embodiment of the present invention.

Referring to FIG. 4A, the rewritable non-volatile memory module has physical blocks 410(0)~410(N) and the memory management circuit 202 of the memory controller 104 logically groups (or assigns) the physical blocks 410(0)~410(N) into a data area 502, a spare area 504, a system area 506 and a replacement area 508.

The physical blocks logically belonging to the data area 502 and the spare area 504 are used for storing data written by the host system 1000. To be specific, the physical blocks of the data area 502 (also referred to as data physical blocks) are physical blocks which have been used for storing data, and the physical blocks of the spare area 504 (also referred to as spare physical blocks) are physical blocks which are used for substituting the physical blocks of the data area 502. For example, when receiving write commands and data to be written from the host system 1000, the memory management circuit 202 selects a physical block from the spare area 504 and writes the data into the selected physical block. Furthermore, when performing a data merging operation for a logical block, the memory management circuit 202 selects a physical block from the spare area 504 as a new data physical block corresponding to the logical block for writing data and substituting for a data physical block originally mapped to the logical block.

In the present exemplary embodiment, the memory management circuit 202 manages the physical blocks of the data area 502 and the spare area 504 in units of each physical block. However, the present invention is not limited thereto and in another exemplary embodiment, the memory management circuit 202 may group the physical blocks belonging to the data area 502 and the spare area 504 into a plurality of physical units and manages the physical blocks in units of each physical unit. For example, each of the physical unit is composed of physical blocks belonging to the same memory die or different memory dies.

The physical blocks logically belonging to the system area 506 are used for recording system data. For example, such system data includes information related to the manufacturer and a model of the rewritable non-volatile memory module, the number of the physical blocks in the rewritable non-volatile memory module, the number of the physical pages in each physical block, and so forth.

The physical blocks logically belonging to the replacement area 508 are physical blocks for a bad physical block replacement procedure to replace damaged physical blocks. To be specific, during the operation of the memory storage apparatus 100, if a physical block in the data area 502 or the spare area 504 becomes a bad physical block, the memory management circuit 202 gets a normal physical block from the replacement area 508 for replacing the bad physical block. Accordingly, the grouping relationships of grouping the physical blocks into the data area 502, the spare area 504, the system area 506 and the replacement area 508 are dynamically changed during the operation of the memory storage apparatus 100. For example, the physical blocks used for alternatively storing data dynamically belong to the data area 502 or the spare area 504.

It should be noted that when the memory storage apparatus is manufactured and pre-formatted (i.e., a pre-formatting operation), the memory management circuit 202 performs a scan disk operation on all the physical blocks 410(0)~410(N) of the rewritable non-volatile memory module 106 to identify good physical blocks, selecting enough good physical blocks for the data area 502, the spare area 504 and the system area 506 from these good physical blocks and groups other good physical blocks into the replacement area 508, wherein the number of the physical blocks are configured in the data area 502, the spare area 504 and the system area 506 is fixed. To be specific, during the manufacture of the rewritable non-volatile memory module 106, defective physical blocks (i.e., bad physical blocks) may be generated, and therefore the memory management circuit 202 has to first identifies available physical blocks (i.e., good physical blocks). Additionally, the number of physical blocks that should be configured into the data area 502, the spare area 504 and the system area 506 are is fixed in the memory storage apparatus 100. In particular, in the present exemplary embodiment, the memory management circuit 202 determines whether the number of the good physical blocks that are grouped into the replacement area during the pre-formatting operation is smaller than a predetermined value. For example, the predetermined value is set to be 10, but the present invention is not limited thereto. If the number of the good physical blocks that are grouped into the replacement area during the pre-formatting operation is smaller than the predetermined value, the memory management circuit 202 groups a portion of bad physical blocks into the data area 502 and moves a portion of good physical blocks from the data area 502 to the replacement area 508, such that the number of the good physical blocks of the replacement area 508 is equal to the predetermined value. That is, the number of the good physical blocks that are grouped into the replacement area 508 during the pre-formatting operation will larger than or equal to the predetermined value. If there are not enough good physical blocks, a portion of bad physical blocks are grouped into the data area 502. In order to explain easily, in the first exemplary embodiment, it is assumed the physical block 410(P) grouped into the data area 502 is a bad physical block.

Referring to FIG. 4B, the memory management circuit 202 configures logical blocks 610(0)~610(H) for mapping to the physical blocks of the data area 502, wherein each of the logical blocks has a plurality of logical pages and the logical pages orderly maps to the physical pages of the corresponding physical block. For example, when the memory storage apparatus 100 is formatted, the logical blocks 610(0)~610(H) are initially mapped to the physical blocks 410(0)~410(F−1) of the data area 502.

In the present exemplary embodiment, the memory management circuit 202 establishes and maintains a block mapping table (e.g., a logical block-physical block mapping table) for recoding mapping relationships between the logical blocks 610(0)~610(H) and the physical blocks of the data area 502. Additionally, because the host system 1000 accesses data in units of each logical access address (e.g., each sector), the memory management circuit 202 converts the logical access addresses 710(0)~710(K), which are provided for accessing by the host system 1000, into logical pages. For example, when the host system 1000 is about to access data at a logical access address, the memory management circuit 202 converts the logical access address into a multi-dimensions address that is composed of a corresponding logical block and a corresponding logical page and accesses data at a corresponding physical page through the block mapping table.

Figure 5:
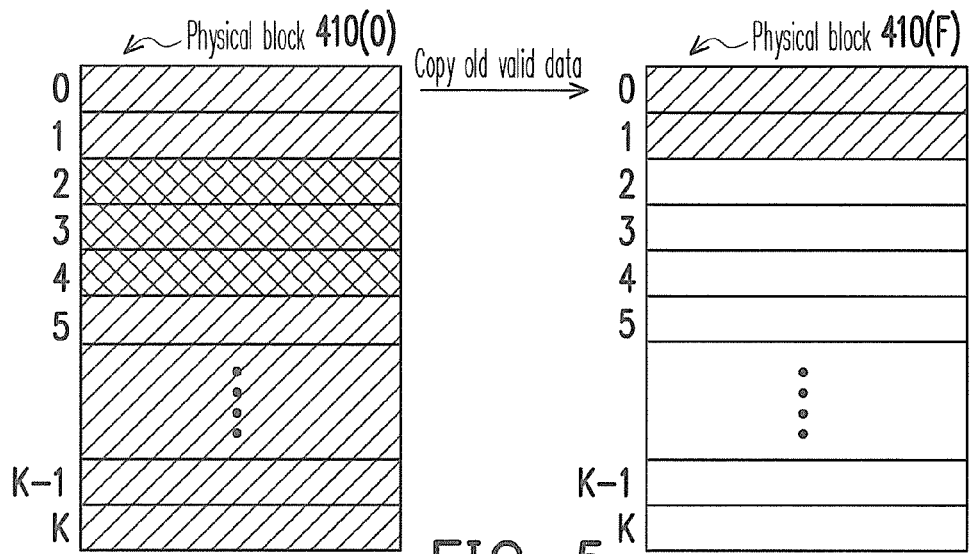
FIGS. 5~7 are exemplary diagrams of writing data into the rewritable non-volatile memory module by using child physical blocks according to the first exemplary embodiment of the present invention.
Figure 6:
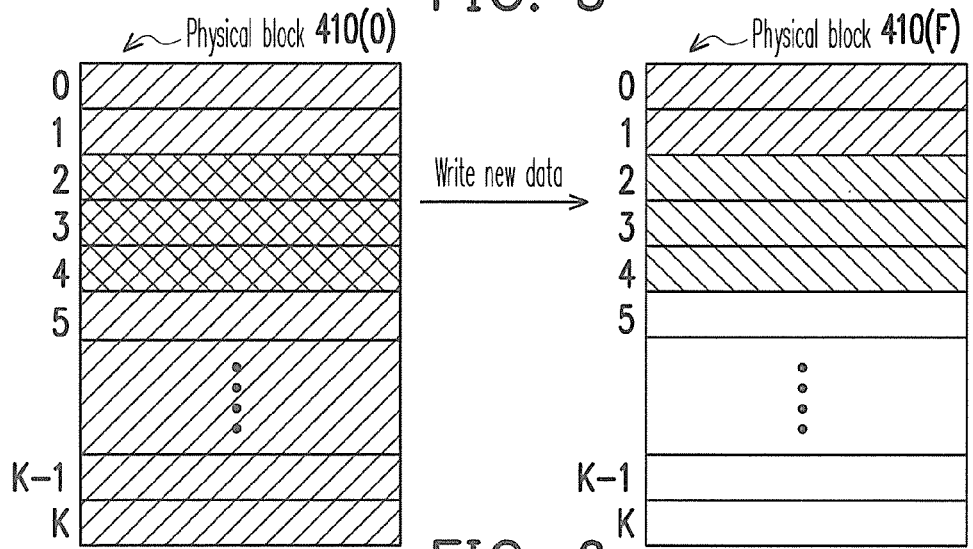
Figure 7:
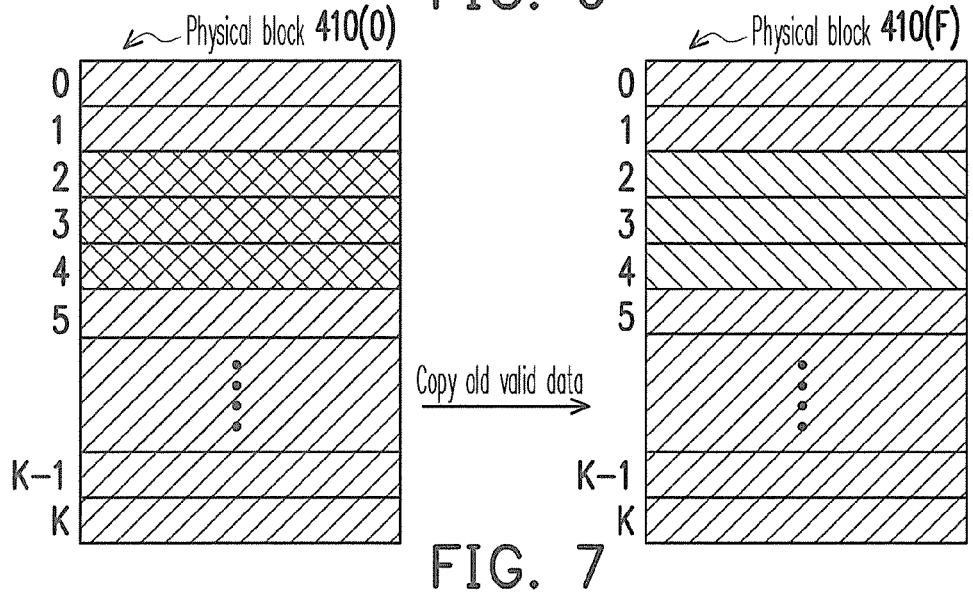

FIGS. 5~7 are exemplary diagrams of writing data into the rewritable non-volatile memory module by using child physical blocks according to the first exemplary embodiment of the present invention.

Referring to FIGS. 5~7, for example, when the logical block 610(0) is currently mapped to the physical block 410(0) and the memory controller 104 receives a write command from the host system 1000 for writing data into the logical page belonging to the logical block 610(0), the memory controller 104 identifies that the logical block 610(0) is currently mapped to the physical block 410(0) based on the block mapping table and selects the physical block 410(F) from the spare area 504 as a substitution physical block for substituting the physical block 410(0). However, the memory controller 104 does not instantly move all the valid data in the physical block 410(0) into the physical block 410(F) and erase the physical block 410(0) when executing the write command. To be specific, the memory controller 104 reads the valid data before the physical page for writing the new data from the physical block 410(0) (i.e., the $0^{th}$ physical page and the $1^{st}$ physical page of the physical block 410(0)). Then, the memory controller 104 writes the valid data before the physical page for writing the new data in the physical block 410(0) into the $0^{th}$ physical page and the $1^{st}$ physical page of the physical block 410(F) (as shown in FIG. 5) and writes the new data into the $2^{nd}$~$4^{th}$ physical pages of the physical block 410(F) (as shown in FIG. 6). At this time, the memory controller 104 has completed the write operation. Because the valid data in the physical block 410 (0) may become invalid during a next operation (for example, next write command), instantly moving all the valid data in the physical block 410 (0) to the physical block 410(F) may become meaningless. Additionally, because data must be written orderly into the physical pages of the physical blocks, the memory controller 104 only moves valid data (i.e. data stored in the $0^{th}$ physical page and the $1^{st}$ physical page of the physical block 410(0)) before the physical page for writing the new data first and does not move other valid data (i.e. data stored in the $5^{th}$~$K^{th}$ physical pages of the physical block 410(0)).

In the present exemplary embodiment, the operation of temporarily keeping this temporary relationship is referred to as opening mother-child blocks, and the original physical block (e.g., the physical block 410(0)) is referred to as a "mother physical block" and the physical block for substituting the original physical block (e.g., the physical block 410 (F)) is referred as to a "child physical block".

Thereafter, the memory controller 104 will merge the valid data stored in the physical block 410(0) and the physical block 410(F) into one physical block when the valid data of the two are to be actually merged, so that the efficiency of using physical blocks can be improved. Herein, the operations of integrating the physical blocks are also referred to as "a data merging operation" or "closing mother-child blocks". For example, as shown in FIG. 7, when closing the mother-child blocks, the memory controller 104 reads rest of the valid data in the physical block 410(0) (i.e. data stored in the $5^{th}$~$K^{th}$ physical pages of the physical block 410(0)) and write the read valid data into to the $5^{th}$~$K^{th}$ physical pages of the physical block 410(F). Then, the memory controller 104 erases the physical block 410(0), associates the physical block 410(0) with the spare area 504 and associates the physical block 410(F) with the data area 502. Namely, the memory controller 104 re-maps the logical block 610(0) to the physical block 410(F) in the block mapping table. Additionally, in the present exemplary embodiment, the memory controller 104 establishes a spare area physical block table (not shown) for recording the physical blocks currently associated with the spare area 504. It should be noted that the physical blocks of the spare area 504 is limited. Accordingly, during the operation of the memory storage apparatus 100, the number of the currently-opened sets for the mother-child blocks is limited. Therefore, when the memory storage apparatus 100 receives a write command from the host system 1000 and the number of the currently-opened sets for the mother-child blocks reaches the maximum value, the memory controller 104 must close one of the currently-opened sets, so as to execute this write command.

FIG. 8 is an example diagram illustrating a block mapping table according to the first exemplary embodiment of the present invention.

Referring to FIG. 8, a block mapping table 800 includes a logical block address field, a physical block address field and a mark field.

The logical block address field is used for recording the logical block provided for accessing by the host system 1000 and the physical block address field is used for recording the physical blocks mapped to the logical blocks.

The mark field is used for recording a mark indicating that one logical block is a good logical address or a bad logical address. To be specific, as described above, when the good physical blocks are not enough, one bad physical block or more bad physical blocks are grouped into the data area 502. Therefore, a portion of logical blocks are mapped to the bad physical blocks. In the present exemplary embodiment, when a mark corresponding to a logical block is recorded as '0' indicating 'a non-damaged status', it represents the logical block is the good logical address; and when a mark corresponding to a logical block is recorded as '1' indicating 'a damaged status', it represents the logical block is the bad logical address. It should be noted that the present invention is not limited thereto and other symbol may be applied to distinguish between the good logical address and the bad logical address. For example, in the present exemplary embodiment, the bad physical block 410(P) in the data area 502 is mapped to the logical block 610(K) when the memory storage apparatus 100 is formatted. Accordingly, the memory management circuit 202 marks the mark corresponding to the logical block 610(K) as '1'.

After the foregoing initiation and formatting procedure, the memory storage apparatus 100 may access data according commands from the host system 1000.

It should be noted that in the present exemplary embodiment, when the memory management circuit 202 receives a write command and data corresponding to the write command from the host system 1000 through the host interface 204, the memory management circuit 202 may identify a logical block corresponding to the write command and determine whether the mark corresponding to the logical block is marked as 'the damaged status'. If the mark corresponding to the logical block is marked as the damaged status, the memory management circuit 202 transmits an error message indicating a write failure to the host system 1000 in response to the write command without performing the write operation. Accordingly, the host system 1000 marks the logical address as a bad track area and does not use the logical address to access data any more.

For example, when the host system 1000 transmits a write command for storing data into the logical block 610(K) to the memory storage apparatus 100, the memory management circuit 202 transmitting the error message to the host system 1000 without performing the write operation. That is, in the present exemplary embodiment, the mapping between the logical block 610(K) and the physical block 410(P) will be fixed and not be changed anymore.

Figure 9:
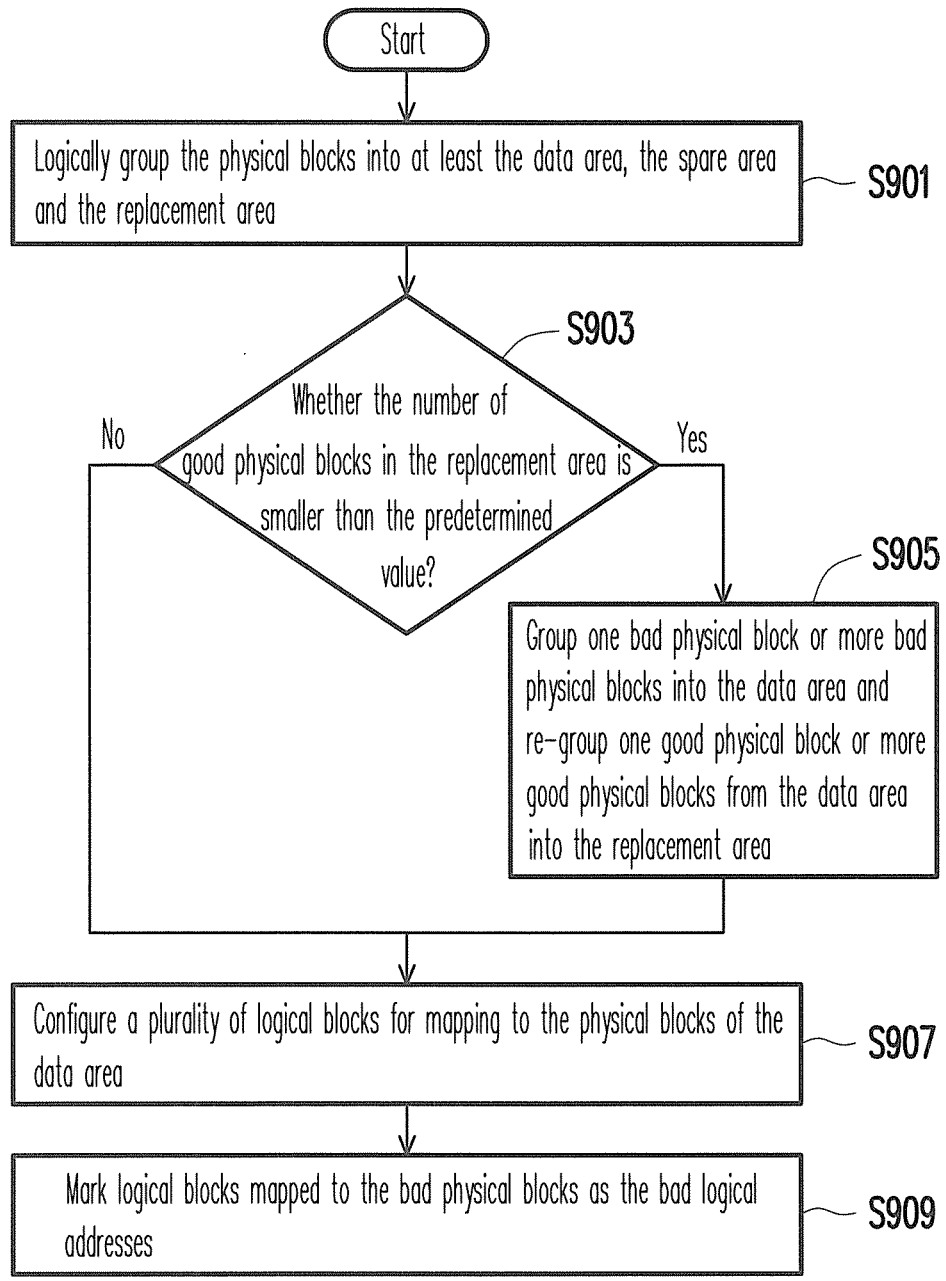
FIG. 9 is a flow chart illustrating steps of grouping physical blocks and configuring logical blocks according to the block management method of the first exemplary embodiment of the present invention.

FIG. 9 is a flow chart illustrating steps of grouping physical blocks and configuring logical blocks according to the block management method of the first exemplary embodiment of the present invention.

Referring to FIG. 9, in step S901, the physical blocks are logically grouped into at least the data area, the spare area and the replacement area. For example, as described above, the memory management circuit 202 of the memory controller 104 may identify good physical blocks in the rewritable non-volatile memory module 106 and group these good physical blocks into the data area 502, the spare area 504, the system area 506 and the replacement area 508.

Thereafter, in step S903, it is determined whether the number of good physical blocks in the replacement area 508 is smaller than the predetermined value.

If the number of good physical blocks in the replacement area 508 is smaller than the predetermined value, in step S905, one bad physical block or more bad physical blocks are grouped into the data area 502 and one good physical block or more good physical blocks in the data area 502 are re-grouped into the replacement area 508, such that the number of good physical blocks in the replacement area 508 is equal to the predetermined value.

After that, in step S907, a plurality of logical blocks are configured for mapping to the physical blocks of the data area 502. And, in step S909, logical blocks mapped to the bad physical blocks are marked as the bad logical addresses. To be specific, in steps S907 and S909, the memory management circuit 202 may map each of the logical blocks to one of the physical blocks of the data area 502 in the block mapping table and record each of the marks corresponding to the logical blocks mapped to the bad physical blocks as the damaged status (as shown in FIG. 8).

Figure 10:
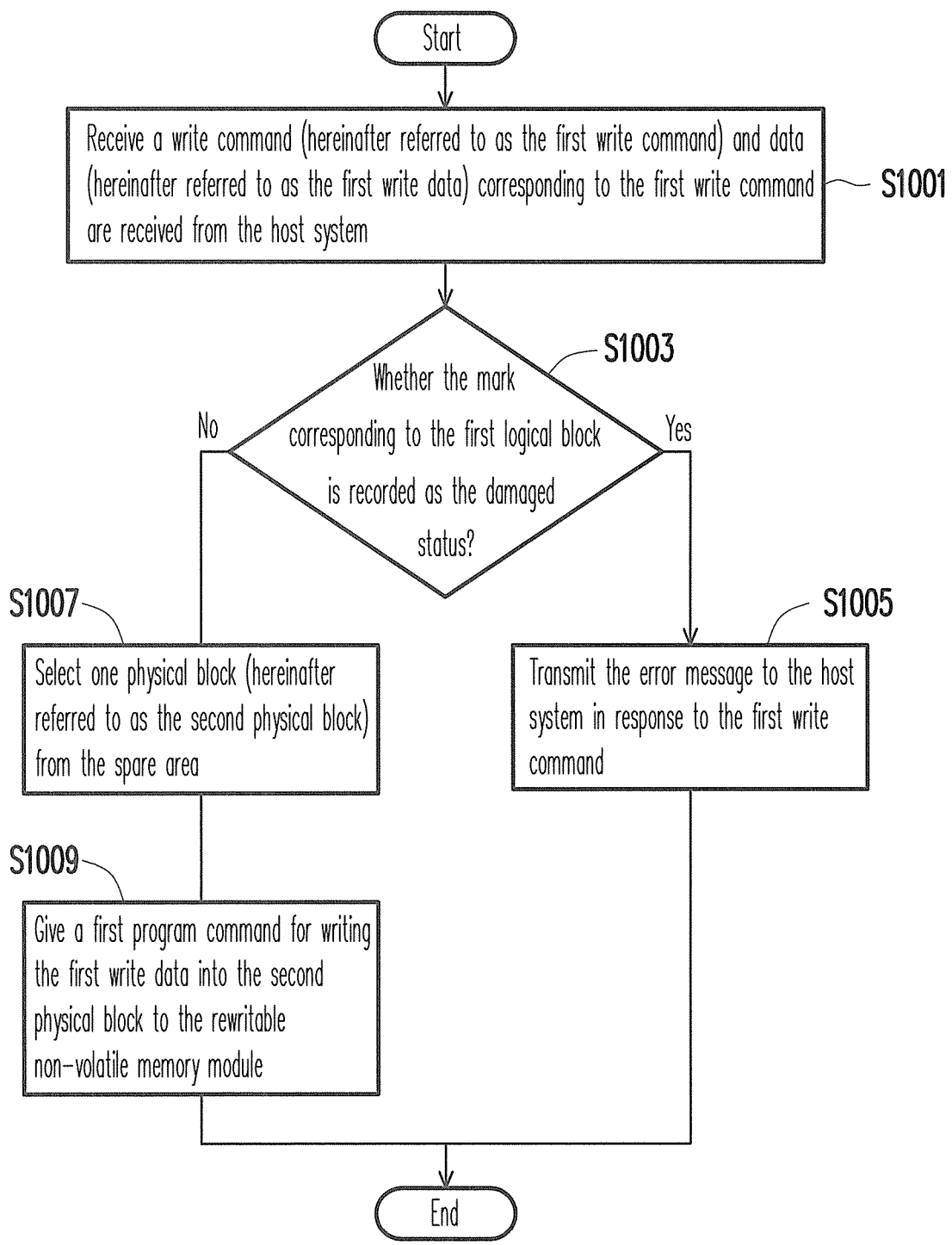
FIG. 10 is a flow chart illustrating steps of performing a write command from a host system according to the block management method of the first exemplary embodiment of the present invention.

FIG. 10 is a flow chart illustrating steps of performing a write command from a host system according to the block management method of the first exemplary embodiment of the present invention.

Referring to FIG. 10, in step S1001, a write command (hereinafter referred to as the first write command) and data (hereinafter referred to as the first write data) corresponding to the first write command are received from the host system 1000. Here, it is assumed that the first write data is about to store into one logical block (i.e., the first write data belongs to the logical bock (hereinafter referred to as the first logical block)) and the first logical block currently maps to a physical block (hereinafter referred to as the first physical block) of the data area 502.

Then, in step S1003, it is determined whether the mark corresponding to the first logical block is recorded as the damaged status.

If the mark corresponding to the logical block is marked as the damaged status, in step S1005, the error message is transmitted to the host system 1000 in response to the first write command. That is, the memory management circuit 202 transmits the error message indicating the write failure to the host system 1000 without giving a program command to the rewritable non-volatile memory module 106.

If the mark corresponding to the logical block is not marked as the damaged status, in step S1007, one physical block (hereinafter referred to as the second physical block) is selected from the spare area 504 and in step S1009, a first program command for writing the first write data into the second physical block is given to the rewritable non-volatile memory module 106. That is, the memory management circuit 202 gives the program command to the rewritable non-volatile memory module 106, such that the data to be stored by the host system 1000 is written into the second physical block selected from the spare area 504.

Additionally, in another exemplary embodiment, if all valid data belonging to the first logical block is written into the second physical block (for example, as shown in FIG. 7), the memory management circuit 202 further remaps the first logical block to the second physical block in the block mapping table 500 and associates the first physical block originally mapped to the first logical block with the spare area 504.

Based on the above, in the first exemplary embodiment, if too many physical blocks are identified as bad physical blocks in the memory storage apparatus 100 during the pre-formatting operation, other good physical blocks in the memory storage apparatus 1000 still can be utilized effectively for storing data.

Second Exemplary Embodiment

The block management method disclosed in the first exemplary embodiment is marking a portion of logical blocks fixedly as bad logical addresses during the pre-formatting operation. That is, a bad logical address is marked during the pre-formatting operation, and thereby other good physical blocks continue to be used for storing data. However, as described above, during the operation of the memory storage apparatus, a good physical block may be damaged after the erasing count of the good physical block exceeds the threshold. In the second exemplary embodiment, the memory management circuit may gradually mark logical blocks as bad logical addresses according to the status of the physical blocks, thereby prolonging the lifespan of the memory storage apparatus. Here, the hardware elements shown in FIGS. 1A, 2 and 3 are used for describing the second exemplary embodiment of the present invention.

In the present exemplary embodiment, the memory management circuit 202 of the memory controller 104 also executes the operations shown in FIGS. 4A, 4B and 5~7 to manage the physical blocks, write data and establish and maintain a block mapping table.

FIG. 11 is an example diagram illustrating a block mapping table established during the pre-formatting operation according to the second exemplary embodiment of the present invention.

Referring to 11, in the present exemplary embodiment, during initiation (i.e., the pre-formatting operation) and formatting, the memory management circuit 202 may map the physical blocks 410(0)~410(F−1) of the data area 502 to the logical blocks 610(0)~610(H), respectively, and record each of the marks corresponding to the logical blocks as '0' indicating the non-damaged status. In the present exemplary embodiment, the memory management circuit 202 does not group the bad physical pages into the data area 502.

In the present exemplary embodiment, when the host system 1000 transmits a write command for storing data into one logical block to the memory storage apparatus 100, the memory management circuit 202 gives a program command for writing the data into a physical block selected from the spare area 504. In particular, when the write data is not written successfully into the selected physical block and there is no available physical block in the replacement area, the memory management circuit 202 re-maps the logical block to the selected physical block, marks the logical block as the bad logical address, associates a physical block originally mapped to the logical block with the spare area 504 and transmits the error message indicating the write failure to the host system 1000. After that, every when the host system 1000 is about to store data into the logical block that is marked as the bad logical address, the memory management circuit 202 transmits the error message to the host system 1000.

Figures 12, 13:
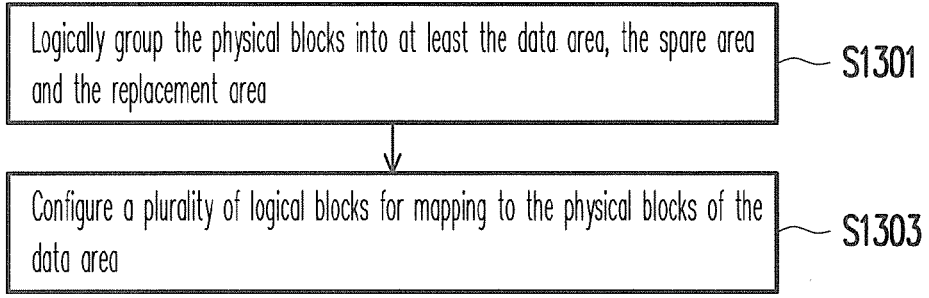
FIG. 12 is another example diagram illustrating a block mapping table according to the second exemplary embodiment of the present invention.
FIG. 13 is a flow chart illustrating steps of grouping physical blocks and configuring logical blocks according to the block management method of the second exemplary embodiment of the present invention.

FIG. 12 is another example diagram illustrating a block mapping table according to the second exemplary embodiment of the present invention.

Referring to FIG. 12, herein, it is assumed that write data to be stored by the host system 1000 belongs to the logical block 610(1), the physical block 410(F) is selected as a child physical block for writing the write data, the physical block 410(F) is identified a damaged physical block due to the program failure and there is no available physical block in the replacement area 508. At this time, the memory management circuit 202 re-maps the logical block 610(1) to the physical block 410(F) in the block mapping table, records the mark corresponding to the logical block 610(1) as the damaged status, associates the physical block 410(1) originally mapped to the logical block 610(1) with the spare area 504 and transmits the error message indicating the write failure to the host system 1000. In particular, after that, when the host system 1000 is about to store data into the logical blocks that are marked as the bad logical addresses, the memory management circuit 202 directly transmits the error message to the host system 1000 without performing the write operation on the rewritable non-volatile memory module 106.

To be specific, because the physical block 410(F) is damaged and there is no available physical block in the replacement area 508, the memory management circuit 202 marks a logical block as the bad logical address by switching a good physical block originally mapped to the logical block with the physical block 410(F) selected from the spare area 504, such that there are enough physical blocks in the spare area 504 to perform other write operation for other good logical addresses. Accordingly, the memory storage apparatus 1000 may continue to be used for storing data until all the logical blocks are marked as the bad logical addresses.

FIG. 13 is a flow chart illustrating steps of grouping physical blocks and configuring logical blocks according to the block management method of the second exemplary embodiment of the present invention.

Referring to FIG. 13, in step S1301, the physical blocks are logically grouped into at least the data area, the spare area and the replacement area. For example, as described above, the memory management circuit 202 of the memory controller 104 may identify good physical blocks in the rewritable non-volatile memory module 106 and group these good physical blocks into the data area 502, the spare area 504, the system area 506 and the replacement area 508.

After that, in step S1303, a plurality of logical blocks are configured for mapping to the physical blocks of the data area 502. To be specific, in steps S1303, the memory management circuit 202 may map each of the logical blocks to one of the physical blocks of the data area 502 in the block mapping table and record each of the marks corresponding to the logical blocks as the non-damaged status (as shown in FIG. 11).

Figure 14:
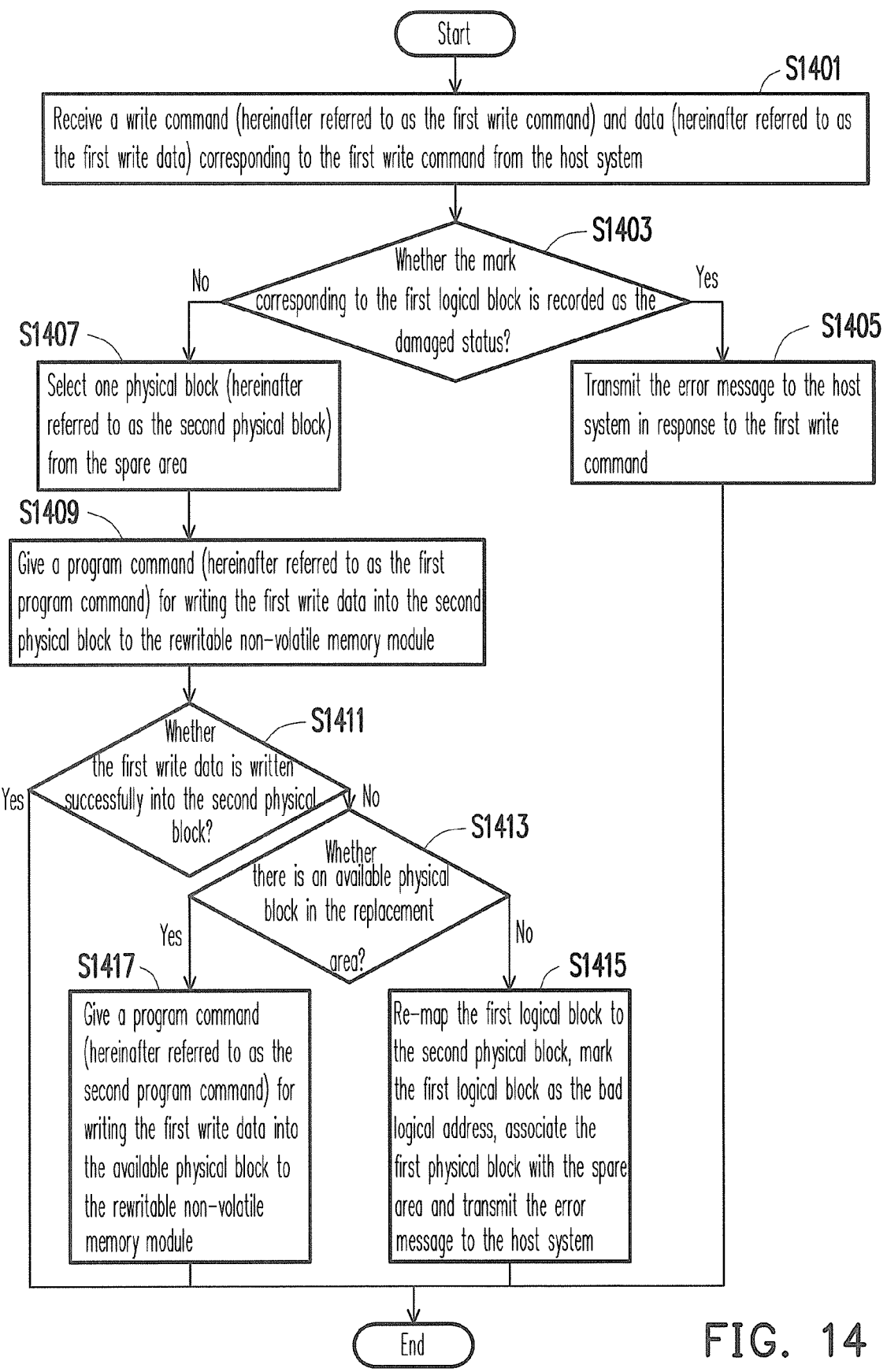
FIG. 14 is a flow chart illustrating steps of performing a write command from a host system according to the block management method of the second exemplary embodiment of the present invention.

FIG. 14 is a flow chart illustrating steps of performing a write command from a host system according to the block management method of the second exemplary embodiment of the present invention.

Referring to FIG. 14, in step S1401, a write command (hereinafter referred to as the first write command) and data (hereinafter referred to as the first write data) corresponding to the first write command are received from the host system 1000. Here, it is assumed that the first write data is about to store into one logical block (i.e., the first write data belongs to the logical bock (hereinafter referred to as the first logical block)) and the first logical block currently maps to a physical block (hereinafter referred to as the first physical block) of the data area 502.

Then, in step S1403, it is determined whether the mark corresponding to the first logical block is recorded as the damaged status.

If the mark corresponding to the first logical block is marked as the damaged status, in step S1405, the error message is transmitted to the host system 1000 in response to the first write command. That is, the memory management circuit 202 directly transmits the error message indicating the write failure to the host system 1000 without giving a program command to the rewritable non-volatile memory module 106.

If the mark corresponding to the first logical block is not marked as the damaged status, in step S1407, one physical block (hereinafter referred to as the second physical block) is selected from the spare area 504 and in step S1409, a program command (hereinafter referred to as the first program command) for writing the first write data into the second physical block is given to the rewritable non-volatile memory module 106. That is, the memory management circuit 202 gives the first program command to the rewritable non-volatile memory module 106, such that the first write data to be stored by the host system 1000 is written into the second physical block selected from the spare area 504.

After that, in step S1411, it is determined whether the first write data is written successfully into the second physical block.

When the first write data is not written successfully into the second physical block, in step S1413, it is determined whether there is an available physical block in the replacement area 508.

When there is no available physical block in the replacement area 508, in step S1415, the first logical block is re-mapped to the second physical block, the first logical block is marked as the bad logical address (i.e., the mark corresponding to the first logical block is recorded as the damaged status), the first physical block is associated with the spare area 504 and the error message is transmitted to the host system 1000.

If there is an available physical block in the replacement area 508, in step S1417, a program command (hereinafter refereed to as the second program command) for writing the first write data into the available physical block is given to the rewritable non-volatile memory module 106.

Based on the above, in the second exemplary embodiment, when a physical block becomes a bad physical block and there is no available physical block in the replacement area 508 during the operation of the memory storage apparatus 100, other good physical blocks in the memory storage apparatus 100 still can be utilized effectively for accessing by the host system 1000.

It should be noted that the bad logical addresses are marked during the pre-formatting operation in the first exemplary embodiment and the bad logical addresses are marked gradually during the operation of the memory storage apparatus in the second exemplary embodiment. However, in another exemplary embodiment, the bad logical addresses are marked during the pre-formatting operation and also are marked gradually during the operation of the memory storage apparatus. For example, memory management circuit 202 executes the steps shown in FIG. 9 to perform the initiation operation (i.e., the pre-formatting operation) for the memory storage apparatus and executes the steps shown in FIG. 14 to write data.

Based on the above, when too many bad physical blocks are identified in the rewritable non-volatile memory module during the pre-formatting operation, the block management method, the memory controller and the memory storage apparatus described above may group damaged physical blocks into the data area and mark logical blocks mapped to the damaged physical blocks as bad logical addresses, thereby the pre-formatting operation still can be completed and good physical blocks in the rewritable non-volatile memory module can be effectively utilized. Additionally, when a physical block becomes a bad physical block and there is no available physical block during the operation of the memory storage apparatus, the block management method, the memory controller and the memory storage apparatus described above may map the bad physical block to a logical block and mark the logical block as the bad logical address, and thereby other good physical blocks may continue to be used and lifespan of the memory storage apparatus may be prolonged. The previously described exemplary embodiments of the present invention have the advantages aforementioned, wherein the advantages aforementioned not required in all versions of the invention.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A block management method for a rewritable non-volatile memory module, wherein the rewritable non-volatile memory module has a plurality of physical blocks, the block management method comprising:
    logically grouping the physical blocks into at least a data area, a spare area and a replacement area, wherein the physical blocks of the data area includes at least one bad physical block;
    configuring a plurality of logical blocks for mapping to the physical blocks of the data area, wherein each of the logical blocks independently maps to one of the physical blocks of the data area; and
    respectively marking at least one logical block mapped to the at least one bad physical block as a bad logical address, wherein a mapping between the at least one logical block and the at least one bad physical block is fixed and not be changed.

2. The block management method according to claim 1, wherein the step of respectively marking the at least one logical block mapped to the at least one bad physical block as the bad logical address comprises:
    recording a plurality of mapping between the logical blocks and the physical blocks of the data area in a block mapping table;
    configuring a plurality of marks respectively for the logical blocks in the block mapping table; and
    respectively marking at least one mark corresponding the at least one logical block mapped to the at least one bad physical block as a damaged status among the marks in the block mapping table.

3. The block management method according to claim 2, further comprising:
    receiving a first write command and a first write data corresponding to the first write command from a host system, wherein the first write data belongs to a first logical block among the logical blocks and the first logical block maps to a first physical block among the physical blocks of the data area;
    determining whether a mark corresponding to the first logical block among the marks is recorded as the damaged status; and
    transmitting an error message to the host system in response to the first write command when the mark corresponding to the first logical block is marked as the damaged status.

4. The block management method according to claim 3, further comprising:
    when the mark corresponding to the first logical block is not marked as the damaged status, selecting a second physical block from the spare area and giving a first program command for writing the first write data into the second physical block.

5. The block management method according to claim 4, further comprising:
    determining whether the first write data is written successfully into the second physical block;
    determining whether there is an available physical block in the replacement area when the first write data is not written successfully into the second physical block;
    when there is no available physical block in the replacement area, remapping the first logical block to the second physical block, recording the mark corresponding to the first logical block as the damaged status in the block mapping table and associating the first physical block with the spare area.

6. A block management method for a rewritable non-volatile memory module, wherein the rewritable non-volatile memory module has a plurality of physical blocks, the block management method comprising:
    logically grouping the physical blocks into at least a data area, a spare area, and a replacement area;
    configuring a plurality of logical blocks for mapping to the physical blocks of the data area, wherein each of the logical blocks independently maps to one of the physical blocks of the data area;
    receiving a first write command and a first write data corresponding to the first write command from a host system, wherein the first write data belongs to a first logical block among the logical blocks and the first logical block maps to a first physical block among the physical blocks of the data area;
    selecting a second physical block from the spare area, giving a first program command for writing the first write data into the second physical block and determining whether the first write data is written successfully into the second physical block;
    determining whether there is an available physical block in the replacement area when the first write data is not written successfully into the second physical block;
    when there is no available physical block in the replacement area, remapping the first logical block to the second physical block, marking the first logical block as a bad logical address and associating the first physical block with the spare area, wherein a mapping between the first logical block and the second physical block is fixed and not be changed.

7. The block management method according to claim 6, further comprising:
    when there is the available physical block in the replacement area, giving a second program command for writing the first write data into the available physical block.

8. The block management method according to claim 6, further comprising:
- recording a plurality of mapping between the logical blocks and the physical blocks of the data area in a block mapping table; and
- configuring a plurality of marks respectively for the logical blocks in the block mapping table,
- wherein the step of marking the first logical block as the bad logical address comprises
- recording a mark corresponding to the first logical block as a damaged status among the marks in the block mapping table.

9. A memory controller for controlling a rewritable non-volatile memory module, wherein the rewritable non-volatile memory module has a plurality of physical blocks, the memory controller comprising:
- a host interface, configured to couple to a host system;
- a memory interface, configured to couple to the rewritable non-volatile memory module; and
- a memory management circuit, coupled to the host interface and the memory interface and configured for logically grouping the physical blocks into at least a data area, a spare area and a replacement area, wherein the physical blocks of the data area includes at least one bad physical block,
- wherein the memory management circuit is further configured for configuring a plurality of logical blocks for mapping to the physical blocks of the data area, wherein each of the logical blocks independently maps to one of the physical blocks of the data area,
- wherein the memory management circuit is further configured for respectively marking at least one logical block mapped to the at least one bad physical block as a bad logical address, wherein a mapping between the at least one logical block and the at least one bad physical block is fixed and not be changed.

10. The memory controller according to claim 9,
- wherein the memory management circuit is further configured recording a plurality of mapping between the logical blocks and the physical blocks of the data area in a block mapping table,
- wherein the memory management circuit is further configured for configuring a plurality of marks respectively for the logical blocks in the block mapping table,
- wherein the memory management circuit is further configured for respectively marking at least one mark corresponding the at least one logical block mapped to the at least one bad physical block as a damaged status among the marks in the block mapping table.

11. The memory controller according to claim 10,
- wherein the memory management circuit is further configured for receiving a first write command and a first write data corresponding to the first write command from the host system through the host interface, wherein the first write data belongs to a first logical block among the logical blocks and the first logical block maps to a first physical block among the physical blocks of the data area,
- wherein the memory management circuit is further configured for determining whether a mark corresponding to the first logical block among the marks is recorded as the damaged status,
- wherein the memory management circuit is further configured for transmitting an error message to the host system in response to the first write command when the mark corresponding to the first logical block is marked as the damaged status.

12. The memory controller according to claim 11,
- wherein when the mark corresponding to the first logical block is not marked as the damaged status, the memory management circuit is further configured for selecting a second physical block from the spare area and giving a first program command for ng the first write data into the second physical block.

13. The memory controller according to claim 12,
- wherein the memory management circuit is further configured for determining whether the first write data is written successfully into the second physical block,
- wherein when the first write data is not written successfully into the second physical block, wherein the memory management circuit is further configured for determining whether there is an available physical block in the replacement area,
- wherein when there is no available physical block in the replacement area, the memory management circuit is further configured for remapping the first logical block to the second physical block, recording the mark corresponding to the first logical block as the damaged status in the block mapping table and associating the first physical block with the spare area.

14. A memory controller for controlling a rewritable non-volatile memory module, wherein the rewritable non-volatile memory module has a plurality of physical blocks, the memory controller comprising:
- a host interface, configured to couple to a host system;
- a memory interface, configured to couple to the rewritable non-volatile memory module; and
- a memory management circuit, coupled to the host interface and the memory interface and configured for logically grouping the physical blocks into at least a data area, a spare area and a replacement area,
- wherein the memory management circuit is further configured for configuring a plurality of logical blocks for mapping to the physical blocks of the data area, wherein each of the logical blocks independently maps to one of the physical blocks of the data area,
- wherein the memory management circuit is further configured for receiving a first write command and a first write data corresponding to the first write command from the host system through the host interface, wherein the first write data belongs to a first logical block among the logical blocks and the first logical block maps to a first physical block among the physical blocks of the data area,
- wherein the memory management circuit is further configured for selecting a second physical block from the spare area, giving a first program command for writing the first write data into the second physical block and determining whether the first write data is written successfully into the second physical block,
- wherein when the first write data is not written successfully into the second physical block, the memory management circuit is further configured for determining whether there is an available physical block in the replacement area,
- wherein when there is no available physical block in the replacement area, the memory management circuit is further configured for remapping the first logical block to the second physical block, marking the first logical block as a bad logical address and associating the first physical block with the spare area, wherein a mapping between the first logical block and the second physical block is fixed and not be changed.

15. The memory controller according to claim 14,
when there is the available physical block in the replacement area, the memory management circuit is further configured for giving a second program command for writing the first write data into the available physical block.

16. The memory controller according to claim 14,
wherein the memory management circuit is further configured recording a plurality of mapping between the logical blocks and the physical blocks of the data area in a block mapping table,
wherein the memory management circuit is further configured for configuring a plurality of marks respectively for the logical blocks in the block mapping table,
wherein the memory management circuit is further configured for recording a mark corresponding to the first logical block as a damaged status among the marks in the block mapping table to mark the first logical block as the bad logical address.

17. A memory storage apparatus, comprising:
a rewritable non-volatile memory module, having a plurality of physical blocks;
a connector, configured to couple to a host system; and
a memory controller, coupled to the rewritable non-volatile memory module and the connector and configured for logically grouping the physical blocks into at least a data area, a spare area and a replacement area, wherein the physical blocks of the data area includes at least one bad physical block,
wherein the memory controller is further configured for configuring a plurality of logical blocks for mapping to the physical blocks of the data area, wherein each of the logical blocks independently maps to one of the physical blocks of the data area,
wherein the memory controller is further configured for respectively marking at least one logical block mapped to the at least one bad physical block as a bad logical address, wherein a mapping between the at least one logical block and the at least one bad physical block is fixed and not be changed.

18. The memory storage apparatus according to claim 17,
wherein the memory controller is further configured recording a plurality of mapping between the logical blocks and the physical blocks of the data area in a block mapping table,
wherein the memory controller is further configured for configuring a plurality of marks respectively for the logical blocks in the block mapping table,
wherein the memory controller is further configured for respectively marking at least one mark corresponding the at least one logical block mapped to the at least one bad physical block as a damaged status among the marks in the block mapping table.

19. The memory storage apparatus according to claim 18,
wherein the memory controller is further configured for receiving a first write command and a first write data corresponding to the first write command from the host system through the connector, wherein the first write data belongs to a first logical block among the logical blocks and the first logical block maps to a first physical block among the physical blocks of the data area,
wherein the memory controller is further configured for determining whether a mark corresponding to the first logical block among the marks is recorded as the damaged status,
wherein the memory controller is further configured for transmitting an error message to the host system in response to the first write command when the mark corresponding to the first logical block is marked as the damaged status.

20. The memory storage apparatus according to claim 19,
wherein when the mark corresponding to the first logical block is not marked as the damaged status, the memory controller is further configured for selecting a second physical block from the spare area and giving a first program command for writing the first write data into the second physical block.

21. The memory storage apparatus according to claim 20,
wherein the memory controller is further configured for determining whether the first write data is written successfully into the second physical block,
wherein when the first write data is not written successfully into the second physical block, the memory controller is further configured for determining whether there is an available physical block in the replacement area,
wherein when there is no available physical block in the replacement area, wherein the memory controller is further configured for remapping the first logical block to the second physical block, recording the mark corresponding to the first logical block as the damaged status in the block mapping table and associating the first physical block with the spare area.

22. A memory storage apparatus, comprising:
a rewritable non-volatile memory module, having a plurality of physical blocks;
a connector, configured to couple to a host system; and
a memory controller, coupled to the rewritable non-volatile memory module and the connector and configured for logically grouping the physical blocks into at least a data area, a spare area and a replacement area,
wherein the memory controller is further configured for configuring a plurality of logical blocks for mapping to the physical blocks of the data area, wherein each of the logical blocks independently maps to one of the physical blocks of the data area,
wherein the memory controller is further configured for receiving a first write command and a first write data corresponding to the first write command from the host system through the connector, wherein the first write data belongs to a first logical block among the logical blocks and the first logical block maps to a first physical block among the physical blocks of the data area,
wherein the memory controller is further configured for selecting a second physical block from the spare area, giving a first program command for writing the first write data into the second physical block and determining whether the first write data is written successfully into the second physical block,
wherein when the first write data is not written successfully into the second physical block, the memory controller is further configured for determining whether there is an available physical block in the replacement area,
wherein when there is no available physical block in the replacement area, the memory controller is further configured for remapping the first logical block to the second physical block, marking the first logical block as a bad logical address and associating the first physical block with the spare area, wherein a mapping between the first logical block and the second physical block is fixed and not be changed.

23. The memory storage apparatus according to claim 22,
when there is the available physical block in the replacement area, the memory controller is further configured for giving a second program command for writing the first write data into the available physical block.

24. The memory storage apparatus according to claim 22,
wherein the memory controller is further configured
  recording a plurality of mapping between the logical blocks and the physical blocks of the data area in a block mapping table,
wherein the memory controller is further configured for configuring a plurality of marks respectively for the logical blocks in the block mapping table,
wherein the memory controller is further configured for recording a mark corresponding to the first logical block as a damaged status among the marks in the block mapping table to mark the first logical block as the bad logical address.

* * * * *